(12) United States Patent
Piette et al.

(10) Patent No.: US 11,055,837 B2
(45) Date of Patent: Jul. 6, 2021

(54) HUMAN PROFILE AND ANOMALY DETECTION

(71) Applicant: Avigilon Corporation, Vancouver (CA)

(72) Inventors: Kevin Piette, Carlisle, MA (US); Pietro Russo, Melrose, MA (US); Bo Yang Yu, Winchester, MA (US)

(73) Assignee: AVIGILON CORPORATION, British Columbia (CA)

( * ) Notice: Subject to any disclaimer, the term of this patent is extended or adjusted under 35 U.S.C. 154(b) by 0 days.

(21) Appl. No.: 16/369,812

(22) Filed: Mar. 29, 2019

(65) Prior Publication Data

US 2020/0311899 A1   Oct. 1, 2020

(51) Int. Cl.
*G06T 7/00* (2017.01)
*G06T 7/50* (2017.01)
(Continued)

(52) U.S. Cl.
CPC .............. *G06T 7/0002* (2013.01); *G01S 7/41* (2013.01); *G01S 13/04* (2013.01); *G01S 13/867* (2013.01);
(Continued)

(58) Field of Classification Search
CPC ....... H04W 12/1204; H04W 12/00518; H04W 12/003; H04W 12/00512; H04W 12/06;
(Continued)

(56) References Cited

U.S. PATENT DOCUMENTS 6,359,582 B1 *   3/2002   MacAleese ............. G01S 7/417
                                                                   342/192
6,856,271 B1 *   2/2005   Hausner .................. G01S 7/025
                                                                   342/189
(Continued)

FOREIGN PATENT DOCUMENTS

EP           2519834 A1 *  11/2012  ............... G01S 7/41

OTHER PUBLICATIONS

Active Millimeter Wave Sensor for Standoff Concealed Threat Detection: Authors: David A. Andrews, Stuart William Harmer, Nicholas J. Bowring, Nacer D. Rezgui, and Matthew J. Southgate; Date: Dec. 2013; IEEE sensors Journal; vol. 13, No. 12, Dec. 2013 pp. 4948-4954 (Year: 2013).*

(Continued)

*Primary Examiner* — Yong Hang Jiang
(74) *Attorney, Agent, or Firm* — Perry + Currier, Inc.

(57) ABSTRACT

A system is provided, including: a radar sensor configured to transmit and receive a radar signal from a person; a depth camera configured to receive a depth image of the person; one or more processors communicative with memory having stored thereon computer program code configured when executed by the one or more processors to cause the one or more processors to perform a method comprising: detect the person; determine depth information relating to the person using the depth image; determine a correlation between the depth information of the person and the radar signal received from the person; and in response to the correlation not within (Continued)

a range of expected values, generating an alert. The depth information may be a volume or surface area of the person.

20 Claims, 16 Drawing Sheets

(51) Int. Cl.
*G06K 9/00* (2006.01)
*G08B 21/22* (2006.01)
*G01S 13/86* (2006.01)
*G01S 7/41* (2006.01)
*G01S 13/04* (2006.01)
*G01S 13/88* (2006.01)

(52) U.S. Cl.
CPC ........ *G01S 13/886* (2013.01); *G06K 9/00369* (2013.01); *G06T 7/50* (2017.01); *G08B 21/22* (2013.01); *G06T 2207/10028* (2013.01); *G06T 2207/10044* (2013.01); *G06T 2207/30196* (2013.01); *G06T 2207/30232* (2013.01)

(58) Field of Classification Search
CPC ........ G06F 21/35; G06F 21/445; G06F 21/73; H04L 9/12; H04L 9/3271; H04L 12/40; H04L 63/0838; G01S 13/04; G01S 13/34; G01S 13/66; G01S 13/865; G01S 13/867; G01S 13/887; G01S 7/024; G01S 7/412; G01S 7/414; G01S 7/415
See application file for complete search history.

(56) References Cited

U.S. PATENT DOCUMENTS

| | | | | |
|---|---|---|---|---|
| 6,967,612 | B1* | 11/2005 | Gorman | G01S 13/34 |
| | | | | 342/22 |
| 7,167,123 | B2 | 1/2007 | Hausner et al. | |
| 8,988,273 | B2* | 3/2015 | Marianer | G01S 7/41 |
| | | | | 342/22 |
| 9,316,732 | B1* | 4/2016 | Mohamadi | H01Q 21/061 |
| 9,564,034 | B2 | 2/2017 | Foster et al. | |
| 9,928,425 | B2 | 3/2018 | Kuznetsov et al. | |
| 10,816,658 | B2* | 10/2020 | Frizzell | H01Q 21/065 |
| 2007/0030195 | A1 | 2/2007 | Steinway et al. | |
| 2009/0010386 | A1* | 1/2009 | Peschmann | G01N 23/20 |
| | | | | 378/57 |
| 2010/0005044 | A1* | 1/2010 | Bowring | G01S 7/025 |
| | | | | 706/20 |
| 2010/0295718 | A1* | 11/2010 | Mohamadi | G01S 7/026 |
| | | | | 342/21 |
| 2011/0304498 | A1* | 12/2011 | Yanagihara | G01S 7/414 |
| | | | | 342/70 |
| 2019/0096220 | A1 | 3/2019 | Anderholm et al. | |

OTHER PUBLICATIONS

International Search Report dated Jul. 2, 2020 issued on corresponding International Application No. PCT/CA2020/050374, 6 pages.

* cited by examiner

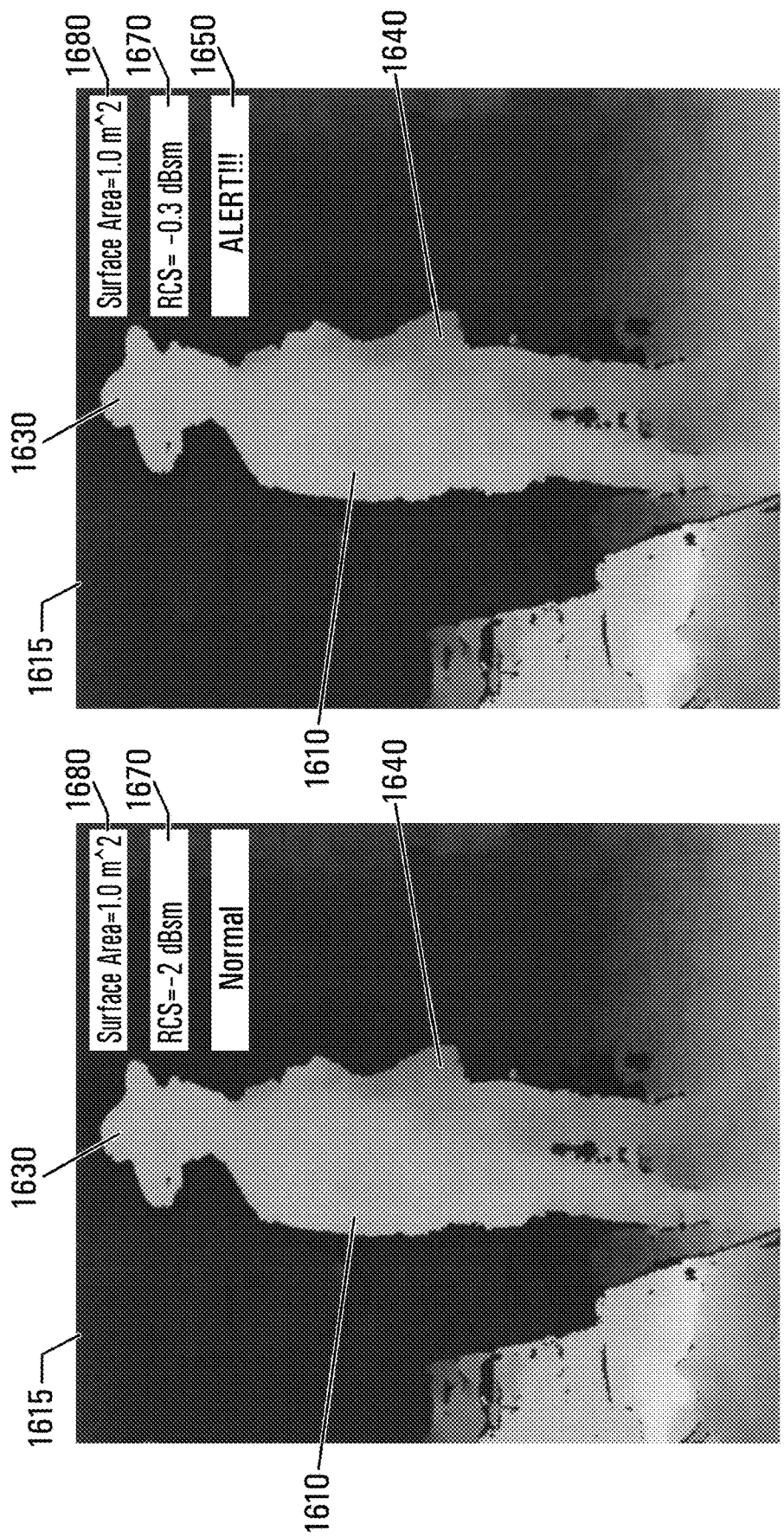

HUMAN PROFILE AND ANOMALY DETECTION

FIELD

The present subject-matter relates to radar and depth sensor systems.

BACKGROUND

A camera is not always suited to determine anomalous objects, such as weapons, being carried by a person, for example when the object is in a pocket or behind a jacket.

In circumstances in which the object being searched for is a weapon, for example during travel or other circumstances, a hand held metal scanner is frequently used, but requires subject compliance. Alternatively a pass through scanner, for example as typically found in airports can be used, but this is also clearly visible to the subject.

SUMMARY

A computer-implemented method of detecting an anomalous presence on a person is provided, including: detecting the person; receiving a radar signature associated with the person; receiving depth information of the person using a depth image from a depth camera; determining an estimated volume or surface area of the person, based on the depth information; comparing the radar signature with the estimated volume or surface area to establish a correlation; and if the correlation is not within an expected range, generating an alert.

The detecting the person may use radar or a camera to detect the person. Generating the alert may include activating a visual alarm and/or activating an audible alarm. The person may be detected at a choke point.

A system is provided, including: a radar sensor configured to transmit and receive a radar signal from a person; a depth camera configured to receive a depth image of the person; one or more processors communicative with memory having stored thereon computer program code configured when executed by the one or more processors to cause the one or more processors to perform a method including: detect the person; determine depth information, which may be volume or surface area of the person, using the depth image; determine a correlation between the depth information of the person and the radar signal received from the person; and in response to the correlation not within a range of expected values, generating an alert.

A computer-readable medium is provided, having stored thereon computer program code configured when executed by one or more processors to cause the one or more processors to perform a method including: detect a person; determine depth information, which may be a volume or surface area of the person, using a depth image received from a depth camera; determine a correlation between the volume of the person and a radar signal associated with the person, the radar signal received from a radar sensor; and in response to the correlation not within an expected range of values, generating an alert.

BRIEF DESCRIPTION OF THE DRAWINGS

The detailed description refers to the following figures, in which:

FIGS. 16A and 16B illustrates displays generated by a system monitoring a person, in accordance with embodiments of the disclosure.

Figure 1:
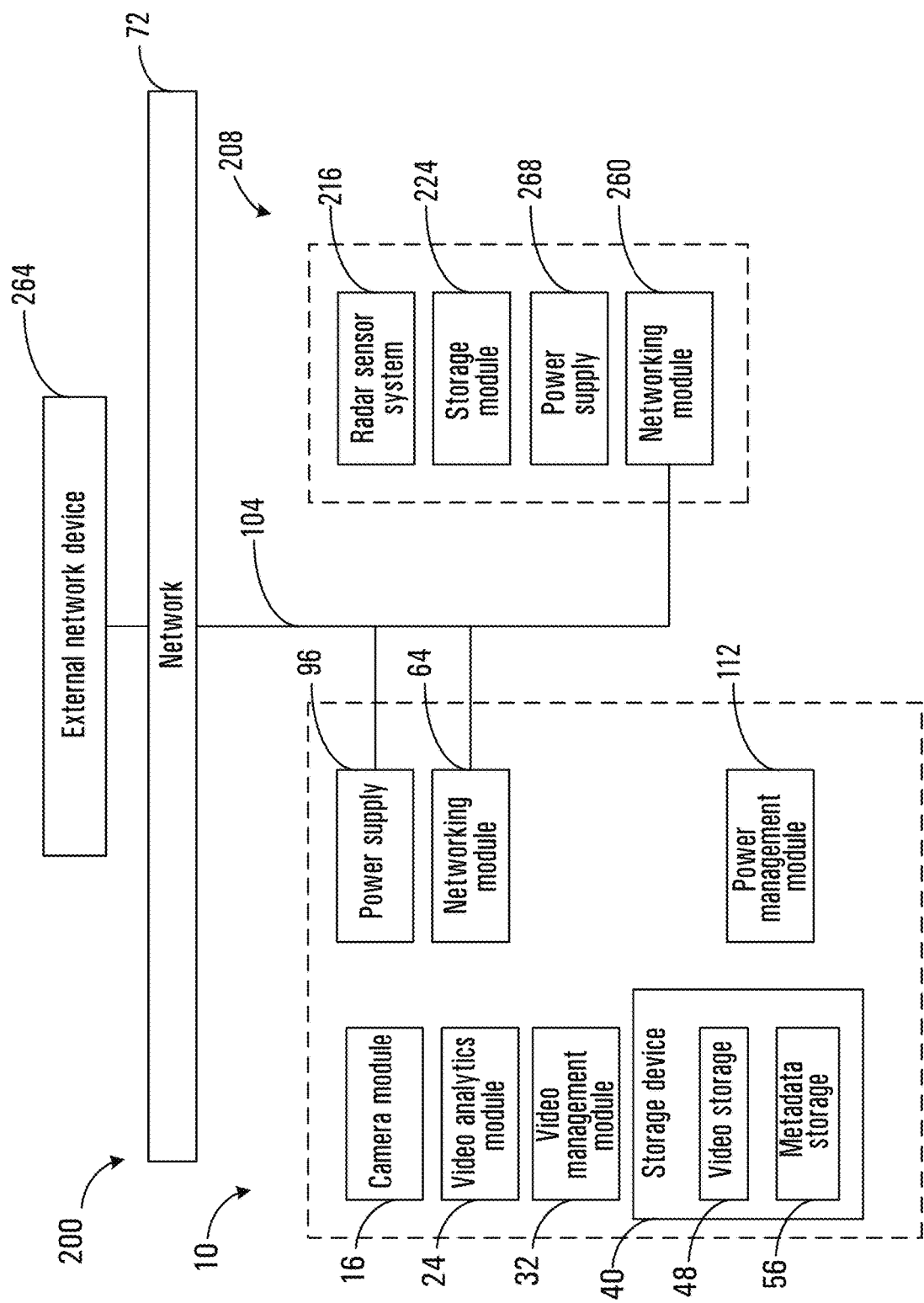
FIG. 1 illustrates a block diagram of a combined system having an example depth camera device and a radar sensor system in accordance with embodiments of the disclosure.

It will be appreciated that for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION OF VARIOUS EMBODIMENTS

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description is intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise. A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise. The term "herein" means "in the present application, including anything which may be incorporated by reference", unless expressly specified otherwise.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed aspect(s) are widely applicable to numerous embodiments, as is readily apparent from the disclosure. One of ordinary skill in the art will recognize that the disclosed aspect(s) may be practiced with various modifications and alterations, such as structural and logical modifications. Although particular features of the disclosed aspect(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application is essential or is coextensive, except where it is either expressly stated to be so in this specification or expressly recited in a claim.

"Battery" herein refers to not only a device in which chemical energy is converted into electricity and used as a source of power, it also refers to any alternatively suitable energy storage devices such as, for example, a capacitor of suitable size and construction.

"Image data" herein refers to data produced by a camera device and that represents images captured by the camera device. The image data may include a plurality of sequential image frames, which together form a video captured by the camera device. Each image frame may be represented by a matrix of pixels, each pixel having a pixel image value. For example, the pixel image value may be a numerical value on grayscale (e.g. 0 to 255) or a plurality of numerical values for colored images. Examples of color spaces used to represent pixel image values in image data include RGB, YUV, CYKM, YCbCr 4:2:2, YCbCr 4:2:0 images. It will be understood that "image data" as used herein can refer to "raw" image data produced by the camera device and/or to image data that has undergone some form of processing. It will be further understood that "image data" may refer to image data representing captured visible light in some examples and may refer to image data representing captured depth information and/or thermal information in other examples.

"Processing image data" or variants thereof herein refers to one or more computer-implemented functions performed on image data. For example, processing image data may include, but is not limited to, image processing operations, analyzing, managing, compressing, encoding, storing, transmitting and/or playing back the video data. Analyzing the image data may include segmenting areas of image frames and detecting objects, tracking and/or classifying objects located within the captured scene represented by the image data. The processing of the image data may cause modified image data to be produced, such as compressed and/or re-encoded image data. The processing of the image data may also cause additional information regarding the image data or objects captured within the images to be outputted. For example, such additional information is commonly understood as metadata. The metadata may also be used for further processing of the image data, such as drawing bounding boxes around detected objects in the image frames.

Referring now to FIG. 1, therein illustrated is a block diagram of a depth camera device 10 according to an example embodiment. The depth camera device 10 is illustrated according its operational modules. An operational module of the depth camera device 10 may be a hardware component. An operational module may also be implemented in hardware, software or combination of both.

The depth camera device 10 includes one or more processors, one or more memory devices coupled to the processors and one or more network interfaces. The memory device can include a local memory (e.g. a random access memory and a cache memory) employed during execution of program instructions. The processor executes computer program instruction (e.g., an operating system and/or application programs), which can be stored in the memory device.

In various embodiments the processor may be implemented by any processing circuit having one or more circuit units, including a digital signal processor (DSP), graphics processing unit (GPU) embedded processor, vision processing unit (VPU) embedded processor, etc., and any combination thereof operating independently or in parallel, including possibly operating redundantly. Such processing circuit may be implemented by one or more integrated circuits (IC), including being implemented by a monolithic integrated circuit (MIC), an Application Specific Integrated (ASIC), a Field Programmable Gate Array (FPGA), etc. or any combination thereof. Additionally or alternatively, such processing circuit may be implemented as a programmable logic controller (PLC), for example. The processor may include circuitry for storing memory, such as digital data, and may, for example, include the memory circuit or be in wired communication with the memory circuit.

In various example embodiments, the memory device is communicatively coupled to the processor circuit and is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device may be implemented together within a system on a chip (SOC). For example, the processor, the memory device and the network interface may be implemented within a SOC. Furthermore, when implemented in this way, both a general purpose processor and DSP may be implemented together within the SOC.

The depth camera device 10 includes at least one 3D camera module 16 (for convenience of illustration only one is shown in the illustrated example embodiment) that is operable to capture a plurality of images and produce image data representing depth information regarding the plurality of captured images. The 3D camera module 16 generally refers to the combination of hardware and software sub-modules that operate together to capture the plurality of images and depth information of a scene. Such sub-modules may include an optical unit (e.g. one or more camera lens) and one or more image sensors. In the case of a digital 3D camera module, the image sensors may be a CMOS, NMOS, or CCD type image sensors.

The lens and sensor combination defines a field of view. When positioned at a given location and at a given orientation, the 3D camera module 16 is operable to capture the real-life scene falling within the field of view of the camera and to generate image data of the captured scene.

The 3D camera module 16 may perform some processing of captured raw image data, such as compressing or encoding the raw image data.

The depth camera device 10 may optionally include a video analytics module 24. The video analytics module 24 receives image data from the 3D camera module 16 and analyzes the image data to determine properties or characteristics of the captured image or video and/or of objects found in scene represented by the image or video. Based on the determinations made, the video analytics module 24 may further output metadata providing information about the determinations. Examples of determinations made by the video analytics module 24 may include one or more of depth data, foreground/background segmentation, object detection, object tracking, object classification, virtual tripwire, anomaly detection, facial detection, facial recognition, license plate recognition, identifying objects "left behind", monitoring objects (i.e. to protect from stealing), unusual motion, object recognition, and business intelligence. However, it will be understood that other video analytics functions known in the art may also be implemented by the video analytics module 24.

The depth camera device 10 may optionally include a video management module 32. The video management module 32 receives image data and performs processing functions on the image data related to video transmission, playback and/or storage. For example, the video management module 32 can process the image data to permit transmission of the image data according to bandwidth requirements and/or capacity. The video management module 32 may also process the image data according to playback capabilities of a client device that will be playing back the video, such as processing power and/or resolution of the display of the client device. The video management module 32 may also process the image data according to storage capacity in the depth camera device 10 or in other devices connected to the depth camera device 10 over a network.

The depth camera device 10 may optionally include a set 40 of storage modules. For example, and as illustrated, the set 40 of storage modules include a video storage module 48 and a metadata storage module 56. The video storage module 48 stores image data, which may be image data processed by the video management module 32. The metadata storage module 56 stores information data output from the video analytics module 24.

It will be understood that while video storage module 48 and metadata storage module 56 are illustrated as separate modules, they may be implemented within a same hardware storage device whereby logical rules are implemented to separate stored video from stored metadata. In other example embodiments, the video storage module 48 and/or the metadata storage module 56 may be implemented within a plurality of hardware storage devices in which a distributed storage scheme may be implemented.

The storage modules 48, 56 provide non-transitory storage of image data and/or metadata. In other example embodiments wherein storage modules 48, 56 are not provided, image data generated by the 3D camera module 16 and metadata generated by the video analytics module 24 may be immediately transmitted to an external device over a network.

The depth camera device 10 includes a networking module 64 operable for providing data communication with another device over a network 72. The network 72 may be a local area network, an external network (e.g. WAN, Internet) or a combination thereof. In other examples, the network 72 may include a cloud network.

The depth camera device 10 further includes a power supply 96 operable for supplying electrical power to the hardware components of the depth camera device 10, such as those implementing the 3D camera module 16 and networking module 64.

In some examples, the power supply 96 receives electrical power from a power source over a wired or wireless connection. The power source may be mains electricity (ex: 110V/220V AC), which may be converted to a supply suitable for the depth camera device 10 (ex: converting to DC, rectifying to a lower voltage). In some alternative examples, the power source may be an intermediate device that supplies power in addition to performing another function, such as processing or networking. In yet further alternative examples, the power supply may be supplying power in a sustainable manner based on, for instance, solar power technology or power received wirelessly from another device in communication with the depth camera device 10.

In one example embodiment, power may be supplied to the power supply 96 over a connection that is also providing data communication. For example, power may be supplied to the power supply 96 by power over Ethernet (POE), wherein the cable connected to the networking module 64 for network data communication is also used for supplying power to the power supply. As illustrated, the same cable 104 that is connected to the network (e.g. connected to a network switch or router) is also connected to the power supply 96.

The depth camera device 10 may further include a power management module 112 that is operable for managing the supply of power from the power supply 96 to various hardware components of the camera device 10. The power management module 112 may further control the priority of providing power to various modules of the camera device 10. This prioritization is for the case of high power demand from various modules, which may otherwise cause system overload. The power level may be varied according to power load requirements from other components of the depth camera device 10.

Sensor system 208 is also connected to network 72, and in conjunction with depth camera 10, forms a combined system 200 according to one example embodiment. The sensor system 208 is a radar sensor system. Sensor system 208 includes a radar sensor system 216.

The sensor system 208 may include a memory storage module 224. The memory storage module 224 may be operatively connected with radar sensor system 216 to receive sensed signals and store the sensed signals. The memory storage module 224 may also store one or more sensing rules. The radar sensor system 216 may implement sensing based on applicable sensing rules. For example, the rules may cause the radar sensor system 216 to cease sensing during given periods of the day, for example when a facility is closed, and carry out sensing at other periods of the day, for example when individuals are entering the facility.

The sensor system 208 includes a networking module 260 operable for providing data communication with the network 72. Sensed signals generated by the radar sensor system 216 can be transmitted from sensor system 208 using its networking module 260 and received at the network 72.

The sensor system 208 may further receive commands over the network 72. For example, the commands may be for controlling the sensor system 208, such as commands for changing sensing rules applied to the sensor system 208.

The sensor system 208 further includes a power management module 268 that is operable for managing power.

In various example embodiments, the depth camera device 10 may be configured to transmit the sensed signals received from the sensor system 208 to an external network device over the network 72. For example, the external network device may be a server that processes or manages the image data and/or the sensed signals. When being transmitted to a networked device, image data that is captured by the 3D camera module 16 at a given time is logically associated with sensed signals pertaining to one or more conditions sensed by the radar sensor system 216 at the same time. "Logically associated" herein refers to an association in which knowledge of the relevant image data allows retrieval of its logically associated sensed signals and vice versa. For example, the image data and its corresponding signal may both include a time stamp, which provides the logical association.

According to various example embodiments wherein the depth camera device 10 is used in a video surveillance application to visually monitor persons traveling through or to an area or asset, such as a school, hospital, workplace or other area, the condition sensed by the sensor system 208 may provide information about the area or asset, which may provide enhanced monitoring.

In some example embodiments, the video analytics module 24 may determine properties or characteristics of the captured image or video and/or of objects found in the scene represented by the image or video based on a combination of analysis of the image data and one or more relevant signals from sensor system 208. Relevant signals sensed by the sensor system 208 may be conditions sensed during a time period corresponding to the time period of the image data being analyzed.

According to various example applications, the sensor system 208 is located in proximity of the depth camera device 10, such as within the same physical area. For example, the sensor system 208 is located such that signals received by the sensor system 208 are relevant to the image data captured by the depth camera device 10. Accordingly, the signals received enhance the monitoring performed using the depth camera device 10. It will be appreciated that the proximity of the depth camera device 10 with the sensor system 208 allows for effective wireless transmission of power from depth camera device 10 to the sensor system 208 and for effective wireless data communication between the depth camera device 10 and the sensor system 208. This allows the sensor system 208 to operate fully wirelessly (i.e. without requiring a wired connection for data communication with an external device and for receiving power).

The system may include at least one workstation (e.g. server), each having one or more processors. The at least one workstation may also include storage memory. The workstation receives image data from at least one depth camera device 10 and performs processing of the image data. The workstation may further send commands for managing and/or controlling one or more of the depth camera device 10 or sensor system 208. The workstation may receive raw image data from the depth camera device 10. Alternatively, or additionally, the workstation may receive image data that has already undergone some intermediate processing, such as processing at the depth camera device 10 and/or at a processing appliance. The workstation may also receive metadata from the image data and perform further processing of the image data.

The video capture and playback system 200 further includes at least one client device connected to the network 72. The client device is used by one or more users to interact with the system 200. Accordingly, the client device includes at least one display device and at least one user input device (for example, mouse, keyboard, touchscreen, joy stick, microphone, gesture recognition device, etc.). The client device is operable to display on its display device a user interface for displaying information, receiving user input, and playing back images and/or video. For example, the client device may be any one of a personal computer, laptops, tablet, personal data assistant (PDA), cell phone, smart phone, gaming device, and other mobile and/or wearable devices.

Radar Sensor

Figure 2:
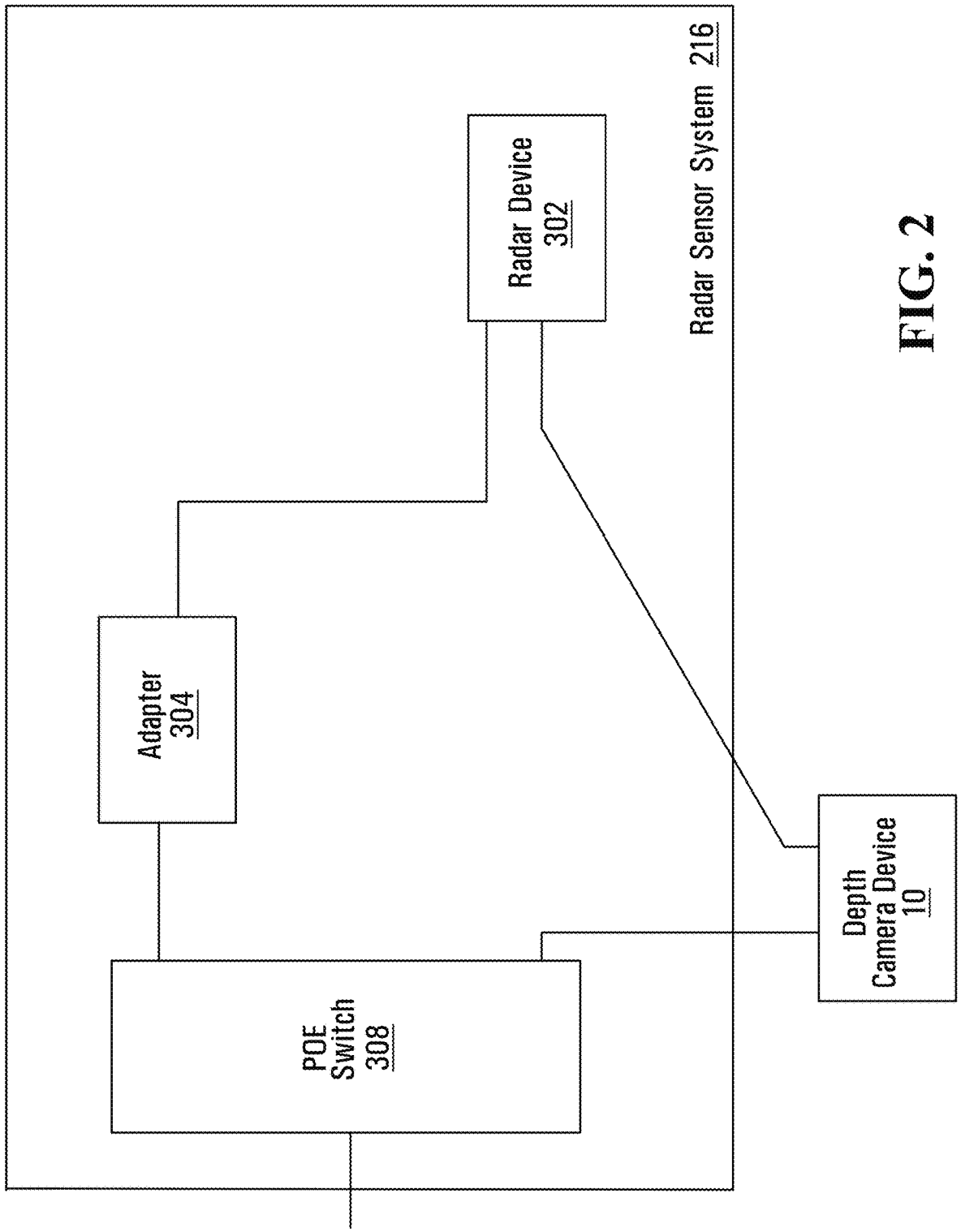
FIG. 2 illustrates a block diagram of a combined system according to another alternative embodiment having an example depth camera device and a radar system in accordance with embodiments of the disclosure.
Figure 3:
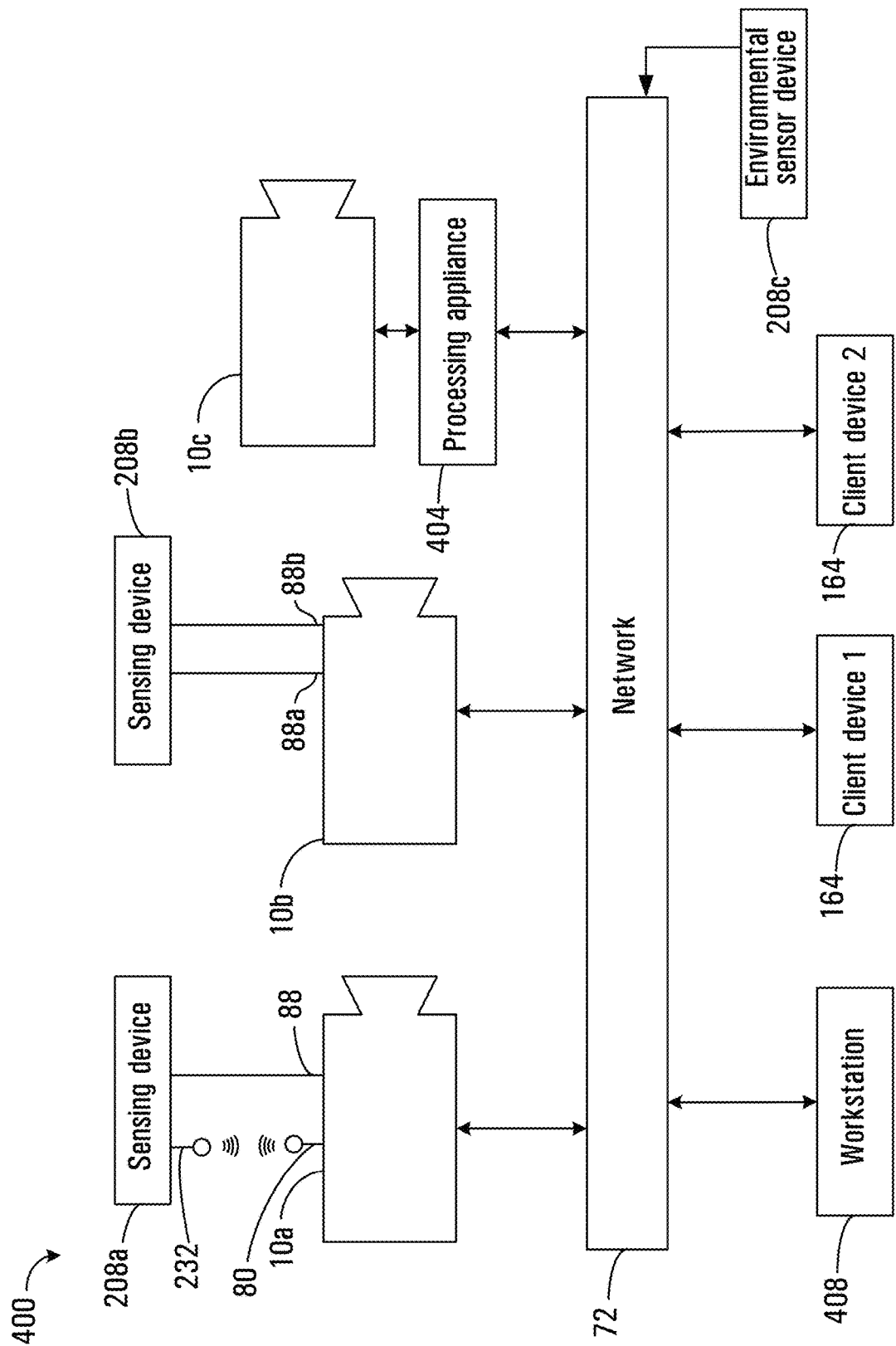
FIG. 3 illustrates a block diagram of connected devices of a surveillance system in accordance with embodiments of the disclosure.
Figure 4:
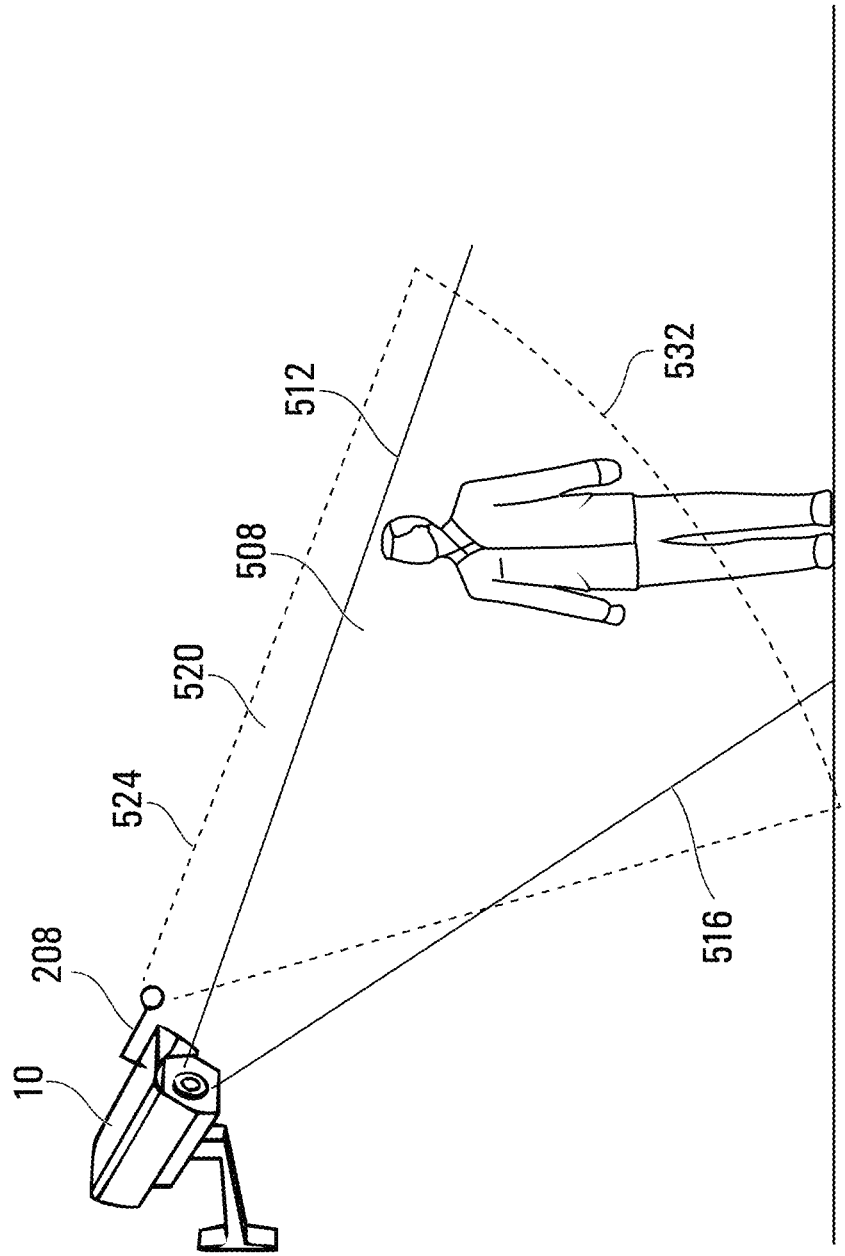
FIG. 4 illustrates a schematic diagram of an example deployment of a depth camera device, a radar sensor system, and a choke point in accordance with embodiments of the disclosure.

Referring now to FIG. 2, sensor system 208 as described above, includes a radar sensor system 216. The radar sensor system 216 include radar device 302, each communicatively coupled to depth camera device 10, for example using a cable connected to relay contacts; and power adaptor 304, for example using a power cable, including for example a 5 VDC and a ground cable. Power adaptor 304 converts signals received from POE switch 308, for example from an Ethernet cable, into power for radar device 302, and depth camera device 10. Data signals are sent from radar device 302 to depth camera device 10 for further processing at depth camera device 10, or sent by depth camera device 10 through POE switch 308, using for example an Ethernet cable, for further processing. It is appreciated that while the embodiment shown in FIG. 2 does not employ a wireless power system, it may be adapted to use such a wireless power system as described above.

Figure 5:
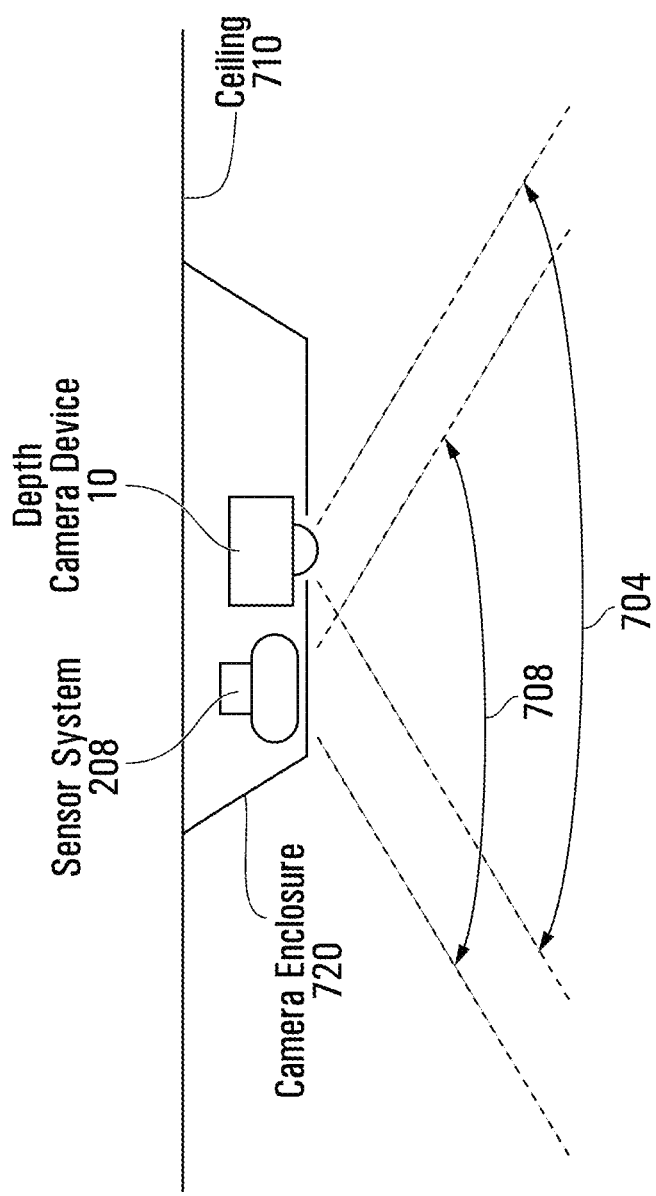
FIG. 5 illustrates a schematic diagram of an example deployment of a depth camera device and radar device in accordance with embodiments of the disclosure.

Referring now to FIG. 5, therein illustrated is a schematic diagram of an example ceiling deployment of a depth camera device 10 and sensor system 208. Depth camera device 10, with field of view 704, may be mounted in enclosure 720. Enclosure 720 is secured to ceiling 710 of, for example, a hallway or corridor or another choke point. Sensor system 208, with field of view 708, may be positioned in enclosure 720 adjacent to depth camera device 10, so that field of views 704 and 708 overlap. The sensor system 208 may be, for example, a UWB radar sensor. The depth camera device 10, including 3D camera module 16, may be, for example, a structured light 3D camera. The video analytics module 24 may, for example, be set to use the outputs from both sensors to detect information about a person.

Figure 6:
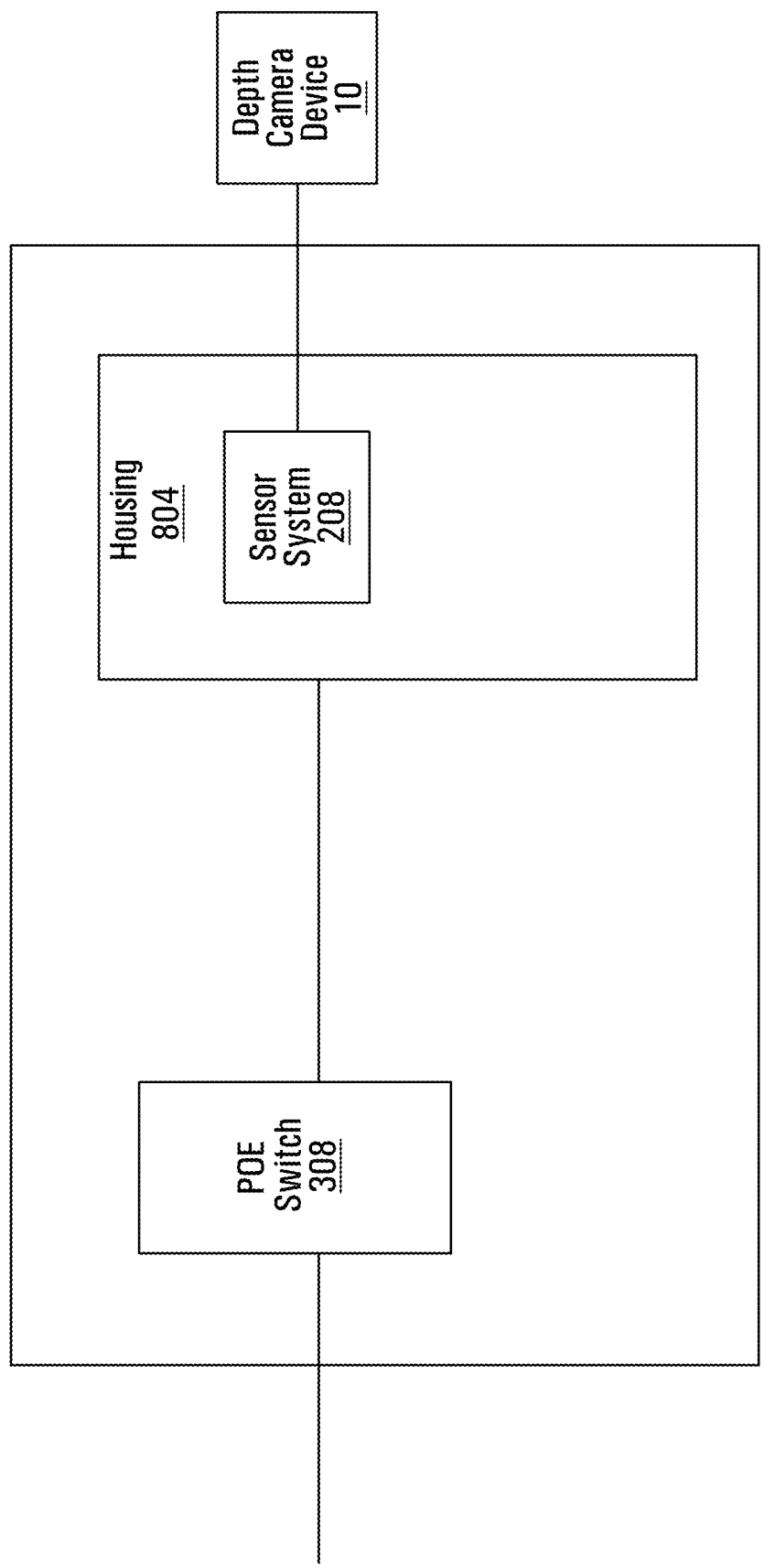
FIG. 6 illustrates a block diagram of a radar device with a depth camera device in accordance with embodiments of the disclosure.

Referring now to FIG. 6, therein illustrated is a block diagram of an example embodiment of a depth camera device 10 and sensor system 208 within a housing 804. Sensor system 208 may be communicatively coupled, via a cable, such as a USB cable, to depth camera device 10 within housing 804. Depth camera device 10 may receive power from and output data to POE switch 308 through a cable, such as an Ethernet cable.

Figure 7:
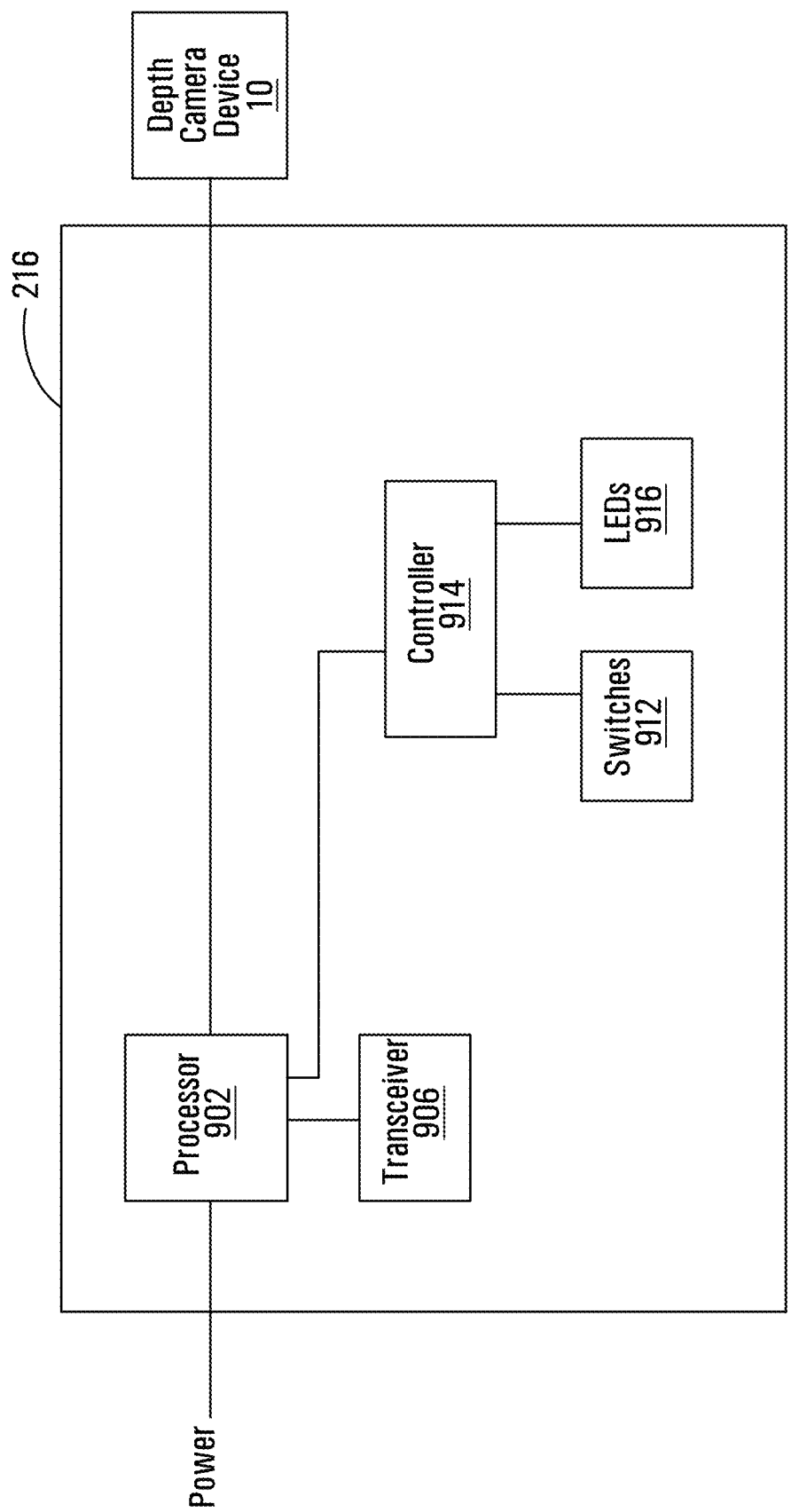
FIG. 7 illustrates a block diagram of a radar device in accordance with embodiments of the disclosure.

Referring now to FIG. 7, therein illustrated is a block diagram of an example embodiment of a radar sensor system 216. Radar sensor system 216 includes processor 902, which may be an ARM-based CPU or similar CPU, and which receives power, which may be received wirelessly, via POE, or other means. Processor 902 receives input from radar transceiver 906, which may be an Ultra-Wideband (UWB) transceiver and outputs to depth camera device 10. Controller 914, communicatively coupled to processor 902 and which may be a breakout board, controls indicators, such as LEDs 910 and may be operated by switches 912.

Figure 8:
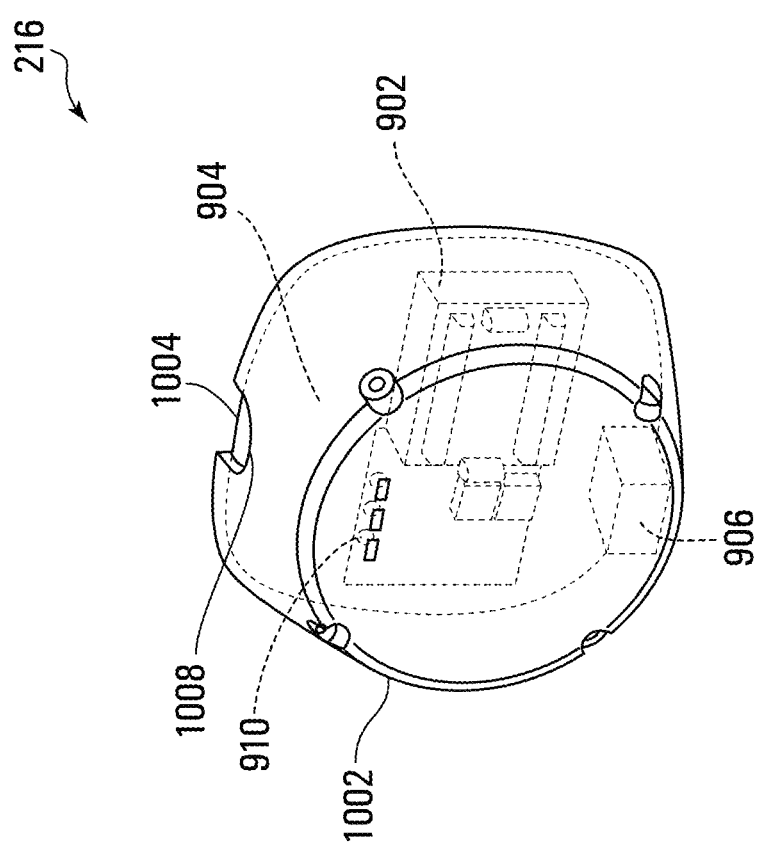
FIG. 8 illustrates a radar device in accordance with embodiments of the disclosure.

Referring now to FIG. 8, therein illustrated is an embodiment of an example of a radar sensor system 216. Radar sensor system 216 includes enclosure 1002, to protect the internal elements of radar sensor system 216. Enclosure 1002 is made of material transparent to radar signals. Opposite enclosure is back plate 1004, typically a flat plate to meet with a surface for mounting radar sensor system 216. Aperture 1008 allows a cable or other connector to enter enclosure 1002. LEDs 910 positioned on enclosure 1002 can be configured to provide status information regarding radar sensor system 216.

Radar sensor system 216 operates by transceiver 906 sending and receiving radar signals. The returning signal will indicate the distance to a detected objected and the Doppler Effect is used to determine a portion of the velocity of the detected object as indicated by the change in frequency of the returned radar signal as determined using a Fourier transformation. Comparing signals over time allows processor 902 to determine the direction of the detected object's motion.

Radar sensor system 216 may be used for a number of purposes, including identifying the presence of a person in a location, such as a dressing room, a prison cell, or ATM vestibule, by detecting biometric indicators such as breathing or heartbeats. Detection of a human being as a living object, and not as a motionless object, can be performed by short-range radars using microwave signals ranging in frequency, waveform, duration, and bandwidth. Radar sensor system 216 can detect people not actively moving, only breathing and with a heartbeat, and thereby determine the presence of a sleeping person. The signal received from the sensor will be based on certain characteristics of the person being sensed. For example, the signal will vary depending on the surface area or volume of a person, or if they are carrying a metal object. For a person of a given volume or surface area, an expected range of signals received can be determined and stored in memory storage module 224.

On reflection from a person, a radar signal acquires specific biometrical modulation, which does not occur in reflections from inanimate objects. This modulation is produced by heartbeats, pulsations of vessels, lungs, and skin vibrations in the region of the person's thorax and larynx, which occur synchronously with breathing motions and heartbeat. These processes are nearly periodic, with typical frequencies in the range of $0.8^{-2.5}$ Hz for heartbeat and $0.2^{-0.5}$ Hz for breathing. Therefore, the delay or phase of the reflected signal is periodically modulated by these periodic oscillations. The modulation parameters are thus determined by the frequencies and intensities of respiration and heartbeat. These biometric signals received can also be used to detect if the person is asleep or not, or is undergoing a health emergency (for example has an erratic heartbeat, which if detected could be used to alert emergency personnel), and can be used to detect persons not otherwise moving The sensitivity of radar probing in the gigahertz band may reach $10^{-9}$ m. In practice, radar probing of live persons is performed against the background of reflections from local objects; as a rule, the intensity of these reflections exceeds the intensity of signals from a human object. Human objects, however, are distinguished by periodic and aperiodic modulation synchronous with the respiration and heartbeat of a person. Modulation of this type is either absent in signals reflected from local objects or has different time and spectral characteristics. This allows for recognition of signals reflected by a human person against the background reflections from local objects.

Radar systems 300 may use probing signals of different types, for example unmodulated monochromatic signals, UWB video pulses, and wideband SFM signals. The main advantage of wideband and UWB signals over monochromatic signals is that they allow the range separation of targets from exterior interference, such as reflections from local objects.

Depth Sensor

A depth map (or depth image) is an image that includes information relating to the distance of the surfaces of scene objects from a viewpoint such as from a depth sensor such as a 3D camera. For each pixel, or group of pixels, in the image of the depth map; there is associated a distance from the depth sensor. Depth maps can use a number of different means to show distance such as by luminance in proportion to the distance to the depth sensor, and by color. An example of luminance in proportion to the distance may be further distances darker and nearer distances lighter in a gray scale image, alternatively, it may be further distances lighter and nearer distances darker. An example of color depth map may use the red green blue (RGB) spectrum: red for further distances, yellow/green for middle distances, and blue for closer distances.

Depth sensors may use a number of different technologies to create depth maps. The technologies include Time-of-Flight (ToF), Stereo, and Structured Light.

Figure 9:
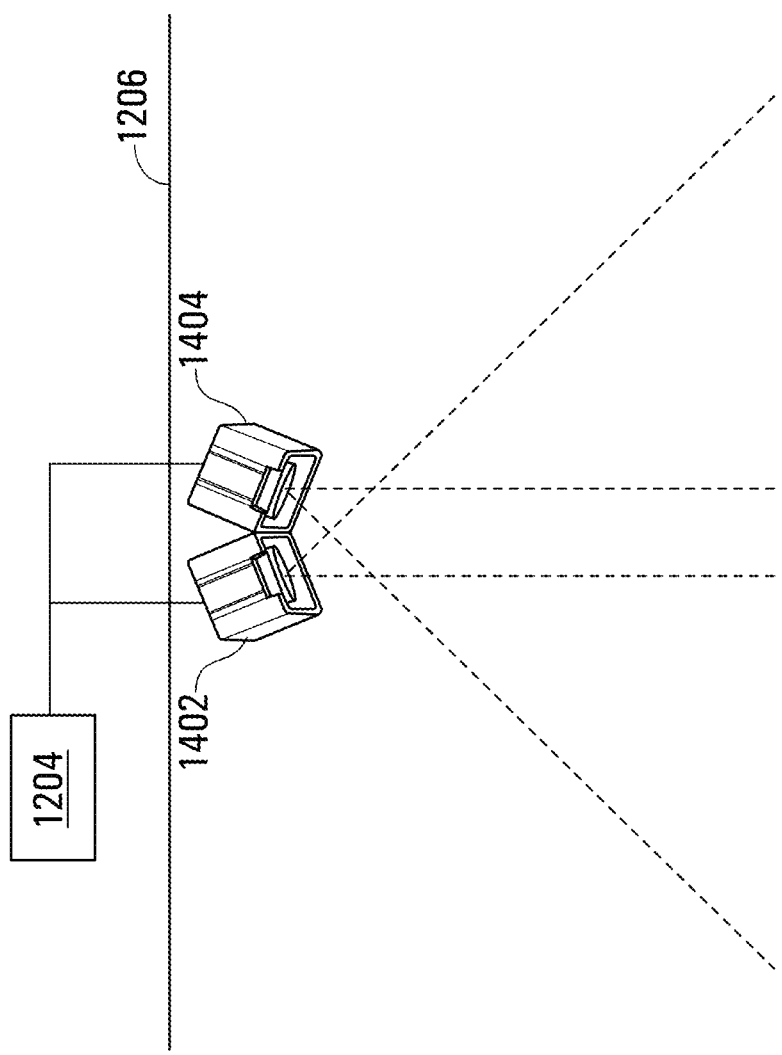
FIG. 9 illustrates an installation of two 3D cameras on the ceiling of a room in accordance with other embodiments of the disclosure.

Referring to FIG. 9, there is shown an embodiment of an example installation of two 3D cameras 1402, 1404 mounted on a ceiling 1206 of a room. The 3D cameras 1402, 1404 may be structured light 3D cameras which provide both 2D images and depth maps (or depth images). A processor 1204 to process the images of the two 3D cameras 1202 is also shown. The room could be a hallway, corridor or a building entrance. The room could include any area or zone under surveillance whether inside a building or outside of a building.

As shown in FIG. 9, the two 3D cameras 1402, 1404 are in an overhead mode which has the best chance of getting an approximate 'size' of the object. However, the overhead mode cameras cannot see what is not in the direct line of sight, for example: a square box is continuous from the top surface of the box all the way to the floor, however, a pyramid can also have an approximate volume (assuming the base is flat against the floor). If, however, you balance the pyramid on the point with the flat part facing the camera, then it will appear as a box to the 3D cameras. For a ball resting on the floor, only the top hemisphere is visible by the camera so the volume calculated would not be for a sphere but instead for a box for the bottom half of the diameter and a hemisphere for the top half. This is a limitation of line of sight range (distance) finding depth sensors such as the two 3D cameras 1402, 1404. Side and corner mounted depth cameras often provide a better view for calculating the 3D surface area of a person standing or walking.

For the application described herein, having an approximate 'size' (or rough 'volume') of an object, such as a person, is sufficient. It may also be sufficient to just count the number of pixels above a certain height threshold which is an estimate of the surface area of the object. Once the surface area is determined and the depth or height is known, the volume is easily calculated.

Figure 10:
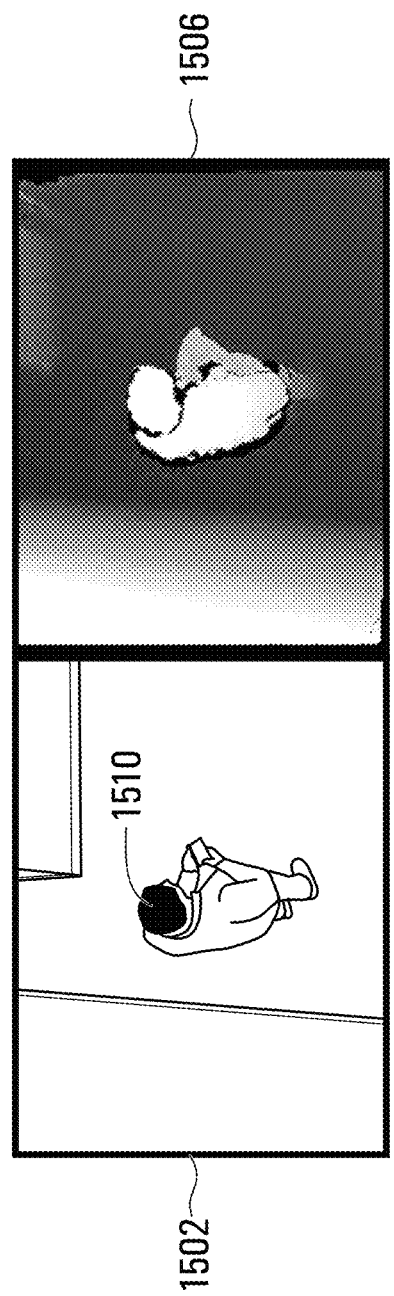
FIG. 10 illustrates example images from the installation of FIG. 9.

Referring to FIG. 10, there is shown example images from the installation of FIG. 9. Shown is a 2D image 1502 and its corresponding depth map 1506. As an example, a person is shown standing in the 2D image 1502 and in the corresponding depth map 1506. The depth map 1506 is displayed using a color map (RGB spectrum) to better visualize the depth information (and shown in grayscale in FIG. 10). Depth map 1506 with the person and a depth map without the person are together the background or the model of the background; the background being the installation room with its floors, walls and any other stationary objects. The model of the background, for example, is composed of average depths from 1000 frames (or camera shots) of the depth maps 1506, and the depth map without a person (when the area under surveillance has no objects in the field of view of the depth sensor) for each of the pixels or group of pixels. Alternatively, the model of the background, for example, is composed of least distances to the 3D cameras 1402, 1404 from 1000 frames of the depth map 1506 for each of the pixels or group of pixels.

Figure 11:
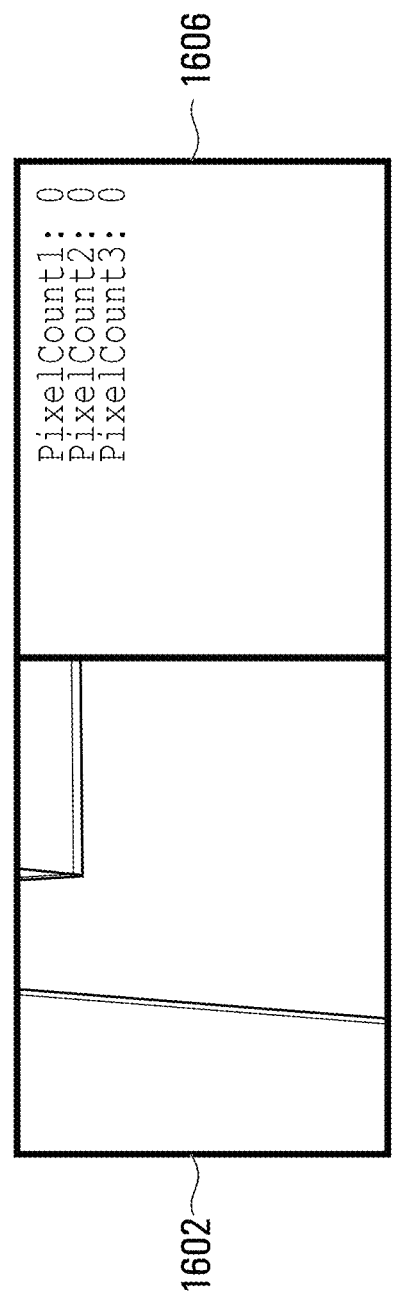
FIG. 11 illustrates additional example images from the installation of FIG. 9.

Referring to FIG. 11, there is shown additional example images from the installation of FIG. 9. There is a two 2D image 1602 and its corresponding delta depth map 1606. There are no objects or people shown in the 2D image and the corresponding delta depth map 1606. The delta depth map 1606 is the net difference between subtracting (or comparing) the depth maps (generated corresponding to the 2D image 1602) from the model of the background. The delta depth map 1606 represents the displacement of an object or objects from the floor of the installation, and would be the foreground. Due to noise, the delta depth map 1606 may not always represent zero displacement, however, within a certain range, for example 1 inch, they are equivalent to zero and is represented as blue in the delta depth map 1606. Further, by setting a threshold of, for example, 4 inches from the floor, "thin" objects, like a paper cup or piece of paper, may be filtered out.

Figure 12:
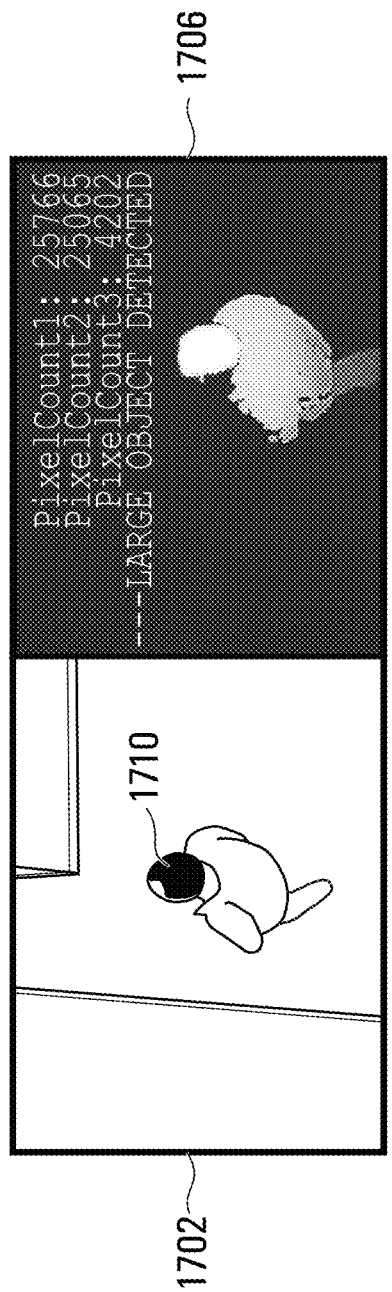
FIG. 12 illustrates additional example images from the installation of FIG. 9 with a person.

Referring to FIG. 12, there is shown additional example images from the installation of FIG. 9 with a person 1710. There is a 2D image 1702 and its corresponding delta depth map 1706. The delta depth map 1706 shows the person 1710 and is detected by the video analytics module 24 as a large object. A surface area or volume may be calculated from the depth information, such as the amount of the displacement of a blob (the person 1710) in the delta depth map 1706. The depth information, either the volume or the amount of the displacement may then be used to indicate whether it could be a person by the video analytics module 24.

Figure 13:
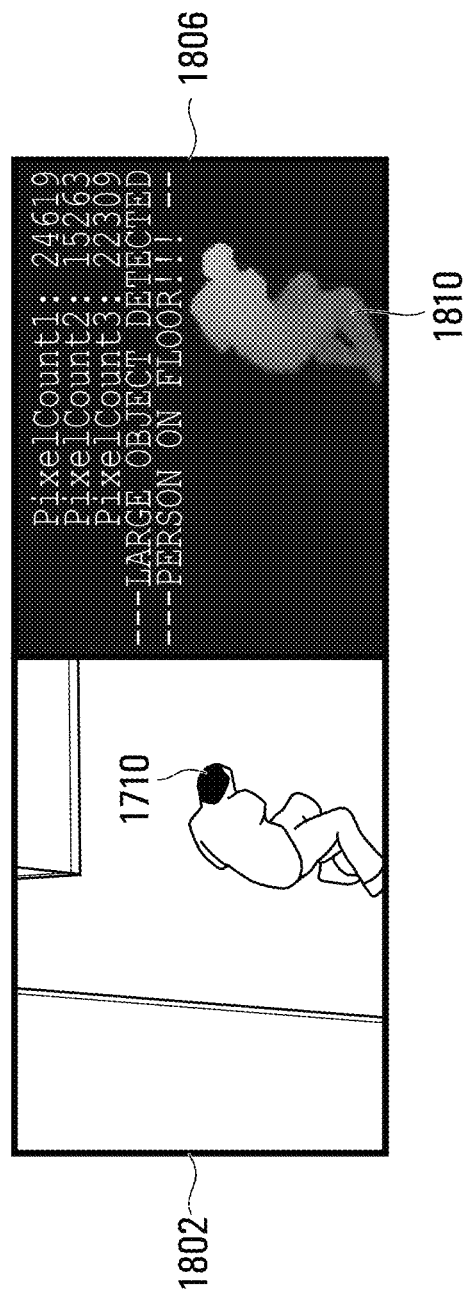
FIG. 13 illustrates additional example images from the installation of FIG. 9 with a person.

Referring to FIG. 13, there is shown additional example images from the installation of FIG. 9 with a person 1710. There is a 2D image 1802 and its corresponding delta depth map 1806. The delta depth map 1806 shows the person 1710 (the blob 1810) and is detected by the video analytics module 24 as a large object due to the amount of displacement (or volume). However, since the least depth of the person 1710 in the delta depth map 1806 is not high and since the volume is sufficient to indicate a person, the video analytics module 24 indicates that the person 1710 is on the floor.

Figure 14:
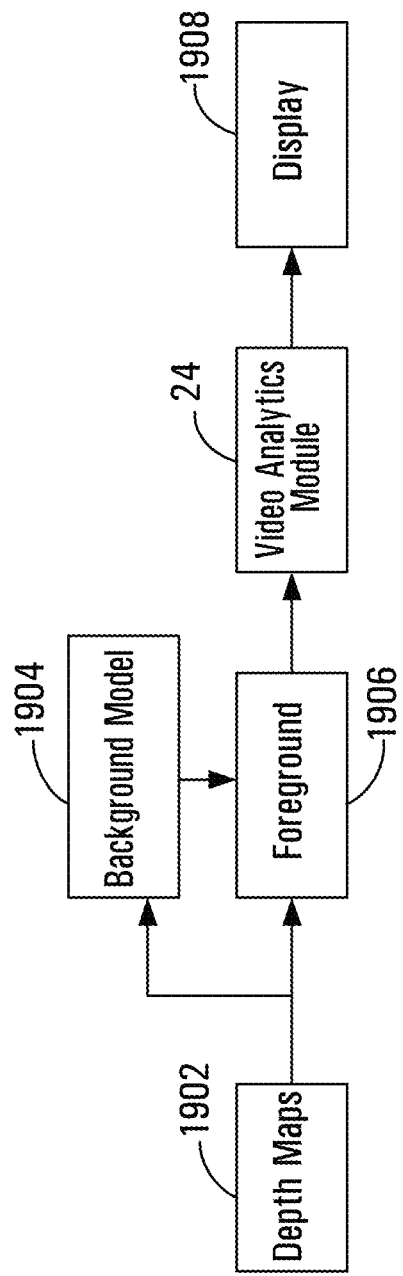
FIG. 14 illustrates a flowchart of the image processing of the installation of FIG. 9 in accordance with embodiments of the disclosure.

Referring to FIG. 14, there is shown a flowchart of an example of an embodiment of image processing of the installation of FIG. 9. The two 3D cameras 1402, 1404 capture depth data to create depth maps 1902 which are processed to create a model of the background 1904. The model of the background 1904 is created by capturing a series (or frames) of depth maps 1902 and every pixel is updated with the lowest non-zero height value (depth) within a certain time period. Within the certain time period, for example, there is 1,000 frames of the depth maps 1902.

There may be certain limitation with the 3D cameras 1402, 1404. The structured light 3D Cameras uses infrared (IR) light patterns to detect depth or distance to target. However, certain types of surfaces (reflective surfaces) reflect away the IR patterns of the structured light of 3D cameras, resulting in no reading (or zero depth) in the depth map. Further, when the ambient IR is strong, the IR patterns can be washed out, resulting in no readings as well. In all cases, in order to generate a stable and valid background model, the depth value of those "no reading" areas have to be estimated. The estimation is based on the neighbor pixels and is called interpolation. There are various methods of interpolation that could be used, for example, morphological filtering and bilinear filtering.

The generation of the model of the background 1904 also includes interpolating the height values (depth) for reflective regions where the 3D cameras 1202 is unable to detect the depth. The model of the background 1904 may be recalculated periodically. Once calculated, any new frames of the depth maps 1902 are subtracted from the model of the background 1904 to produce corresponding foreground frames 1906 (delta depth maps). The value of each pixel of the model of the background 1904 is subtracted from the value of each corresponding pixel of each frame of the depth maps 1902 to produce the foreground frames 1906 or delta depth maps. Where there is only one 3D camera, each depth map frame (a 3D camera shot) is compared to the model of the background to generate a corresponding foreground frame. The video analytics module 24 then analyzes the foreground frames 1906 to detect objects, large objects, and people, and use the depth information to determine an estimated volume or surface area for each person detected. The results are then displayed 1908.

The Process

Figure 15:
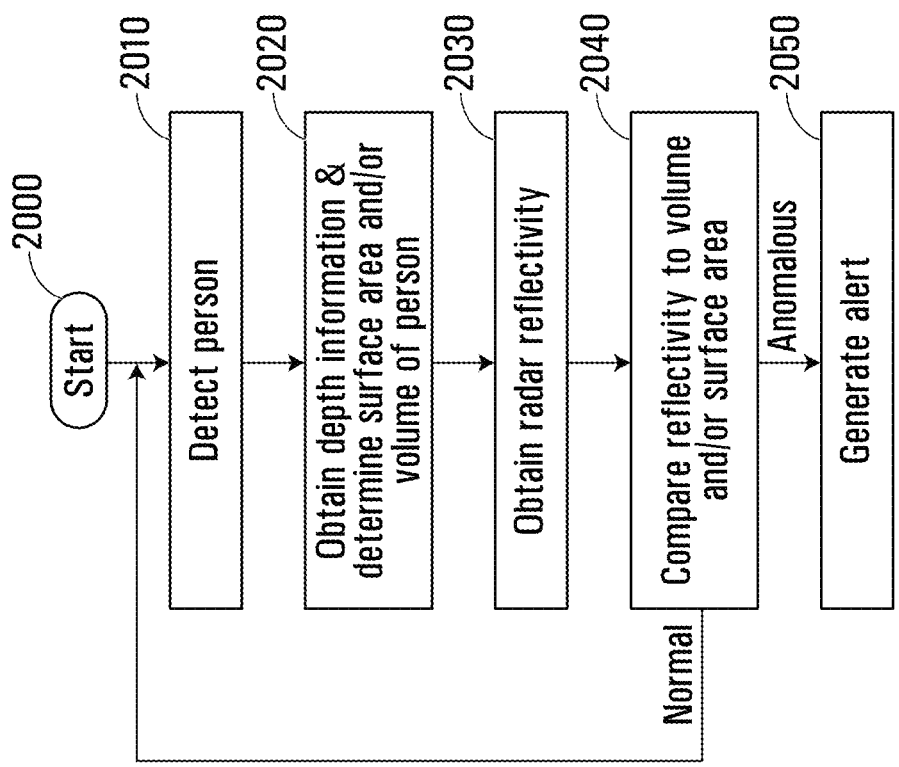
FIG. 15 illustrates a flowchart of a process by which a radar system and 3D cameras determine anomalous objects in accordance with embodiments of the disclosure.

With reference to FIG. 15, a process is shown by which anomalies can be detected in persons through the use of combined system 200. At a first step a person must be detected (2010). This can be done through traditional video surveillance techniques as described above, using sensor system 208 and/or depth camera device 10, or using other devices such as a weight activated pad or motion detector.

The person may be travelling through an area in the field of view of both depth camera device 10 and radar sensor system 216. For example, depth camera device 10 and radar system 216 may have respective fields of view covering a travel choke point. Such as choke point may include a corridor, or may be an artificial choke point such a security checkpoint at an airport so that persons traveling from a first location to a second location pass through the checkpoint. An embodiment may include an entrance to a building, such as a school, in which alerts can be sent to a central station, and may include an image of the person triggering the alert.

Following the detection, depth information is received from depth camera 10, and used to determine or estimate the volume or surface area of the person (step 2020), and a reflected radar signal is received by radar sensor system 216 (step 2030). While receiving the depth information to determine the volume or surface area, and receiving the radar signal are shown sequentially in FIG. 15, the order of the steps may be reversed, or the steps may completed simultaneously or in an overlapping time frame.

The volume or surface area determination uses depth information from depth camera device 10 to determine an approximation of a person's size either by a 3D volume calculation or by using the surface area visible in the field of view of depth camera device 10.

For example, in an embodiment, the exposed surface area can be calculated from a 3D Depth map 1615, as shown in FIGS. 16A and 16B. Using a body surface area calculator (for example as found at https://www.calculator.net/body-surface-area-calculator.html) a 200 lb 6'0" male person 1610 has a surface area of approximately 2.15 square meters using the Mosteller formula. In the pose shown in FIGS. 16A, 16B about 50% of the surface area of person 1610 is visible in the frame as well as a hat 1630 and a bag 1640, and the surface area of male person 1610 is determined to be approximately 1.0 m².

Instead of, or in addition to, calculation of surface area, volume may be calculated by using depth maps 1615 as described above.

The reflected radar signal in step 2030 is a radar cross-section (RCS) which represents a measurement as to the detectability of an object by radar. The energy of the RCS is influenced by a number of factors including the size of the target, material of the target, and incident angle. An individual person will have a certain expected RCS based on their incidence angle to the camera, their size, and their shape. An object such as a weapon or pressure cooker are typically made of materials, such as metal, that have very strong radar reflections. Thus a person carrying such an object would have a larger RCS than expected for a person of their size and shape. In an embodiment, the RCS may be input into a trained neural network, such as a trained convolutional neural network, to obtain a vector indicative of the reflected radar signal.

In an embodiment, a doppler spectrogram showing a doppler signature for an object can be an additional or alternative measure of radar reflectivity. Cross and co-polarization are compared and the ratio is enhanced in the presence of certain materials, such as metal.

Multiple measurements of RCS or depth information at different distances can be captured in order to capture different angles for use in determining surface area and/or volume, as the surface area of a person or an object on the person may vary depending on the angle.

With reference to FIGS. 16A and 16B, which display two depth map images 1615 of sample output for a user interface according to an embodiment, including the RCS 1670 and surface area 1680 for a person 1610 in the pose shown (or with that amount of surface area exposed). In the images 1615 shown, the individual shown looks the same using the depth camera 10 for both a normal and an alert situation; only the radar signature (RCS) differs)

A comparison is then made between the reflected radar signal (RCS) and the volume or surface are of the person to obtain a statistical correlation (step 2040) to generate a correlation. The radar signal may be processed before the correlation is generated. The correlation is compared to a range of expected correlations in memory storage module 224 or set of modules 40 and a determination is made as to whether the correlation is within an expected value.

The average human body RCS (computed over all aspect angles) varies in a tight range from −4 to 0 dBsm and at the angle of person 1610 seen from the depth camera 10 may be expected to be between −1.0 to −3.0 dBsm. If the actual measured RCS of the person is greater than −1.0 dBsm an anomaly is indicated as Alert 1650, which may need attention (i.e. more radar energy than expected is being reflected, which may indicate a weapon).

The user interface may include a simple alert 1650 when a disparity is detected and may also a message to security personnel. The alert 1605 may be displayed in a visual representation. An audio alert may be generated.

If the correlation is within the expected range of values, combined system 200 does not generate an alert, and waits to detect the next person.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

The invention claimed is:

1. A computer-implemented method of detecting an anomalous presence on a person, comprising:
   detecting the person;
   receiving a radar signature associated with the person;
   receiving depth information from a depth camera;
   processing the depth information;
   comparing the radar signature with the processed depth information to establish a correlation between the radar signature and the processed depth information that is not within an expected range; and
   in response to the correlation being established, generating an alert.

2. The computer-implemented method of claim 1, wherein the processed depth information is a volume of the person.

3. The computer-implemented method of claim 1 wherein the processed depth information is a surface area of a person.

4. The computer-implemented method of claim 1, wherein detecting the person comprises using radar to detect the person.

5. The computer-implemented method of claim 1, wherein detecting the person comprises using a camera to detect the person.

6. The computer-implemented method of claim 5, wherein the camera is the depth camera.

7. The computer-implemented method of claim 1, wherein generating the alert comprises one or more of: activating a visual alarm; and activating an audible alarm.

8. The computer-implemented method of claim 1, wherein the person is detected at a choke point.

9. A system comprising:
   a radar sensor configured to transmit and receive a radar signal from a person;
   a depth camera configured to receive a depth image of the person;
   one or more processors communicative with memory having stored thereon computer program code configured when executed by the one or more processors to cause the one or more processors to perform a method comprising:
      detect the person;
      determine depth information relating to the person using the depth image;
      determine a correlation between the depth information of the person and the radar signal received from the person; and
      in response to the correlation not being within a range of expected values, generating an alert.

10. The system of claim 9, wherein the depth information is a volume of the person.

11. The system of claim 9, wherein the depth information is a surface area of the person.

12. The system of claim 9, wherein generating the alert comprises one or more of: activating a visual alarm; and activating an audible alarm.

13. The system of claim 9, wherein the person is detected at a choke point.

14. A non-transitory computer-readable medium having stored thereon computer program code configured when executed by one or more processors to cause the one or more processors to perform a method comprising:
   detect a person;
   determine depth information of the person using a depth image received from a depth camera;
   determine a correlation between the depth information of the person and a radar signal associated with the person, the radar signal received from a radar sensor; and
   in response to the correlation not being within an expected range of values, generating an alert.

15. The non-transitory computer-readable medium of claim 14, wherein the depth information is a volume of the person.

16. The non-transitory computer-readable medium of claim 14, wherein the depth information is a surface area of the person.

17. The non-transitory computer-readable medium of claim 14, wherein detecting the person comprises using radar to detect the person.

18. The non-transitory computer-readable medium of claim 14, wherein detecting the person comprises using a camera to detect the person.

19. The non-transitory computer-readable medium of claim 14, wherein generating the alert comprises one or more of: activating a visual alarm; and activating an audible alarm.

20. The non-transitory computer-readable medium of claim 14, wherein the person is detected at a choke point.

* * * * *